United States Patent
Kang

(10) Patent No.: US 12,101,538 B2
(45) Date of Patent: Sep. 24, 2024

(54) IMAGE ACQUISITION DEVICE AND METHOD FOR ADJUSTING FOCUS POSITION THEREOF

(71) Applicant: VIEWORKS CO., LTD., Anyang-si (KR)

(72) Inventor: Chang Woo Kang, Anyang-si (KR)

(73) Assignee: VIEWORKS CO., LTD., Anyang-si (KR)

( * ) Notice: Subject to any disclaimer, the term of this patent is extended or adjusted under 35 U.S.C. 154(b) by 170 days.

(21) Appl. No.: 17/884,381

(22) Filed: Aug. 9, 2022

(65) Prior Publication Data

US 2023/0046634 A1 Feb. 16, 2023

(30) Foreign Application Priority Data

Aug. 11, 2021 (KR) .................. 10-2021-0106236

(51) Int. Cl.
*H04N 23/45* (2023.01)
*G02B 7/04* (2021.01)
*G02B 21/00* (2006.01)
*H04N 23/67* (2023.01)

(52) U.S. Cl.
CPC .......... *H04N 23/45* (2023.01); *H04N 23/673* (2023.01)

(58) Field of Classification Search
CPC .......... H04N 23/45; H04N 23/67; G02B 7/28; G02B 7/282; G02B 7/34; G02B 7/343; G02B 21/006; G02B 21/241

USPC ........................................................ 348/345

See application file for complete search history.

(56) References Cited

U.S. PATENT DOCUMENTS

| 5,262,646 A | * | 11/1993 | Booker | G01N 21/9501 |
| | | | | 250/353 |
| 2003/0112504 A1 | * | 6/2003 | Czarnetzki | G02B 21/241 |
| | | | | 359/383 |
| 2016/0320599 A1 | * | 11/2016 | Bathe | G02B 21/0032 |
| 2020/0267306 A1 | * | 8/2020 | Nakayama | H04N 23/67 |
| 2022/0075175 A1 | * | 3/2022 | Kleppe | G02B 21/0076 |
| 2023/0418037 A1 | * | 12/2023 | Gouch | G02B 21/0068 |

FOREIGN PATENT DOCUMENTS

| JP | 2010-091739 A | 4/2010 |
| JP | 6123034 B2 | 4/2017 |
| JP | 6151824 B2 | 6/2017 |
| JP | 2019-146185 A | 8/2019 |
| KR | 20180058730 A | 6/2018 |

* cited by examiner

*Primary Examiner* — Anthony J Daniels
(74) *Attorney, Agent, or Firm* — Rabin & Berdo, P.C.

(57) ABSTRACT

Provided are an image acquisition device and a method for adjusting a focus position using the same, which can acquire an accurate focus position without a decrease in light amount incident in an image photographing sensor. The image acquisition device according to an exemplary embodiment of the present invention includes: a first sensor collecting some of the beams projected from a sample to generate a first image; and a second sensor collecting at least some of the remaining beams of the beams projected from the sample to generate a second image for measuring a focus position, in which a focus of the first sensor is adjusted by the focus position measured by using the second sensor.

16 Claims, 9 Drawing Sheets

[REGION WHICH BECOMES SECOND IMAGE]   [CONTRAST GRAPH FOR EACH PIXEL REGION]

(a)

(b)

IMAGE ACQUISITION DEVICE AND METHOD FOR ADJUSTING FOCUS POSITION THEREOF

CROSS-REFERENCE TO RELATED APPLICATIONS

This application claims priority to and the benefit of Korean Patent Application No. 10-2021-0106236 filed in the Korean Intellectual Property Office on Aug. 11, 2021 the entire contents of which are incorporated herein by reference.

TECHNICAL FIELD

The present invention relates to an image acquisition device and a method for adjusting a focus position using the same, and particularly, to an image acquisition device and a method for adjusting a focus position thereof, which can acquire an accurate focus position without a decrease in light amount incident in an image photographing sensor.

BACKGROUND ART

In general, most dual camera type microscopes capable of high-speed focus position determination use a configuration and a method of dividing and making a light be incident in an "image photographing sensor" and a "focus position determination sensor" by using a beam splitter.

In this case, a portion of the light incident in the beam splitter transmits the beam splitter and is incident in the image photographing sensor and the rest of the light incident in the beam splitter is reflected by the beam splitter and incident in the focus position determination sensor.

By the above configuration, an image for image acquisition is formed through the image photographing sensor, and the focus position determination sensor adjusts a focus of a lens.

However, according to the dual camera type microscope using the beam splitter, since the entire light are not incident in the image photographing sensor, but only a portion of the light is incident in the image photographing sensor through the beam splitter, there is a disadvantage in that the light amount incident in the image photographing sensor is decreased, and since an exposure time should be set longer upon photographing in order to overcome the disadvantage, there is a problem in that a photographing time becomes longer.

SUMMARY OF THE INVENTION

The present invention has been made in an effort to provide an image acquisition device and a method for adjusting a focus position thereof, which can acquire an accurate focus position without a decrease in light amount incident in an image photographing sensor.

An exemplary embodiment of the present invention provides an image acquisition device including: a first sensor collecting some of the beams projected from a sample to generate a first image; and a second sensor collecting at least some of the remaining beams of the beams projected from the sample to generate a second image for measuring a focus position, in which a focus of the first sensor is adjusted by the focus position measured by using the second sensor.

In an exemplary embodiment, an optical path length until some of the beams projected from the sample reach the first sensor may be equal to an optical path length until at least some of the remaining beams of the beams projected from the sample reach the second sensor.

The first sensor may be disposed perpendicular to an optical axis.

The second sensor may be disposed to be tilted to an axis perpendicular to the optical axis at a predetermined angle.

In an exemplary embodiment, the image acquisition device may further include: a tube lens in which the beam projected from the sample is incident; an object lens disposed below the tube lens; a defocus amount detection unit analyzing the second image and detecting a defocus amount of the second sensor; a defocus correction value calculation unit calculating a defocus correction value according to the detected defocus amount of the second sensor; and a focus adjustment unit adjusting a focus of the tube lens or the object lens according to the calculated defocus correction value.

In an exemplary embodiment, the defocus amount detection unit may be configured to detect the defocus amount of the second sensor by determining a highest contrast point of a region which becomes the second image.

In an image circle formed by the tube lens, the region which becomes the second image may be generated in an outer region of the region which becomes the first image.

The first sensor and the second sensor may be any one of a TDI sensor, a line scan sensor, or an area scan sensor.

In an exemplary embodiment, the image acquisition device may further include a reflector reflecting at least some of the remaining beams of the beams projected from the sample to be incident in the second sensor.

The second sensor may be disposed spaced apart from the first sensor.

The reflector may be closer to the sample than to the first sensor when viewed in an optical axis direction.

A length of the reflector in a scan direction may be set to be smaller than a length of the first sensor in the scan direction.

In an exemplary embodiment, the image acquisition device may include: a tube lens in which the beam projected from the sample is incident; and an object lens disposed below the tube lens, in which the tube lens may be disposed below the first sensor.

In an exemplary embodiment, the second sensor may be disposed adjacent to the first sensor, and the second sensor may be located on the same line in a horizontal direction to the first sensor when viewed in the optical axis direction.

A length of the second sensor in the scan direction may be set to be smaller than the length of the first sensor in the scan direction.

In an exemplary embodiment, the image acquisition device may include: a tube lens in which the beam projected from the sample is incident; and an object lens disposed below the tube lens, in which the tube lens may be disposed below the first sensor and the second sensor.

Another exemplary embodiment of the present invention provides a method for adjusting a focus position of an image acquisition device including an image photographing sensor and a focus position determination sensor, including: analyzing an image generated in the focus position determination sensor and detecting a defocus amount of the focus position determination sensor; calculating a defocus correction value according to the detected defocus amount of the focus position determination sensor; and adjusting a focus of a tube lens or an object lens according to the calculated defocus correction value.

In an exemplary embodiment, in the detecting of the defocus amount, a highest contrast point of a region which becomes the image generated in the focus position determination sensor is determined to detect the defocus amount of the focus position determination sensor.

According to exemplary embodiments of the present invention, since a sample can be photographed at a high speed without a decrease in light amount incident in an image photographing sensor an accurate focus position at a next photographing position can be acquired, an image acquisition device can acquire an automatic focus position and a photographing time can be reduced.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
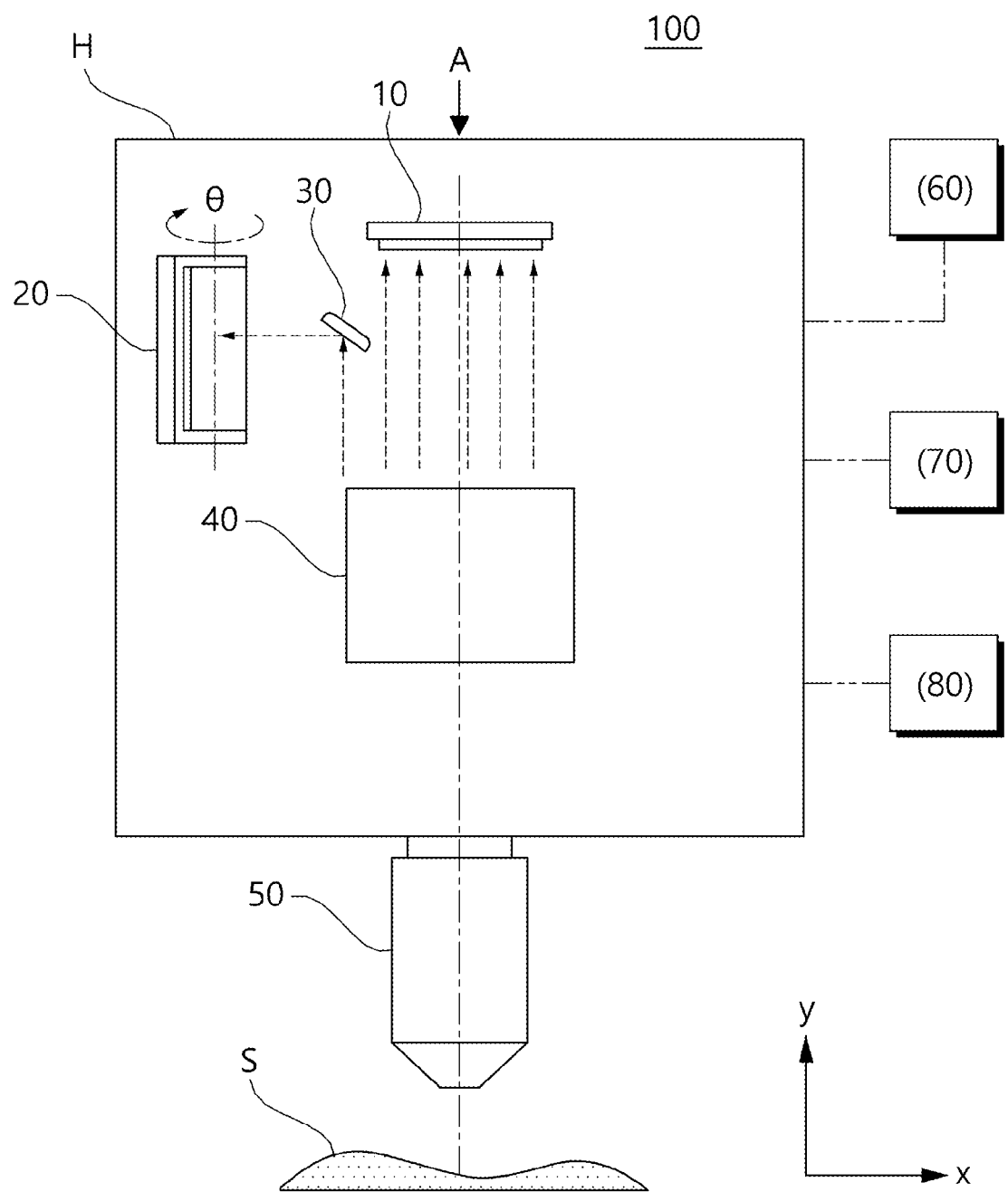
FIG. 1 is a diagram illustrating an image acquisition device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a preferred embodiment of the present invention will be described in detail with reference to the accompanying drawings. First, when reference numerals refer to components of each drawing, it is to be noted that although the same components are illustrated in different drawings, the same components are denoted by the same reference numerals as possible. Further, in describing the present invention, a detailed description of known related configurations and functions may be omitted to avoid unnecessarily obscuring the subject matter of the present invention. Further, hereinafter, the preferred embodiment of the present invention will be described, but the technical spirit of the present invention is not limited thereto or restricted thereby and the embodiments can be modified and variously executed by those skilled in the art.

Figure 2:
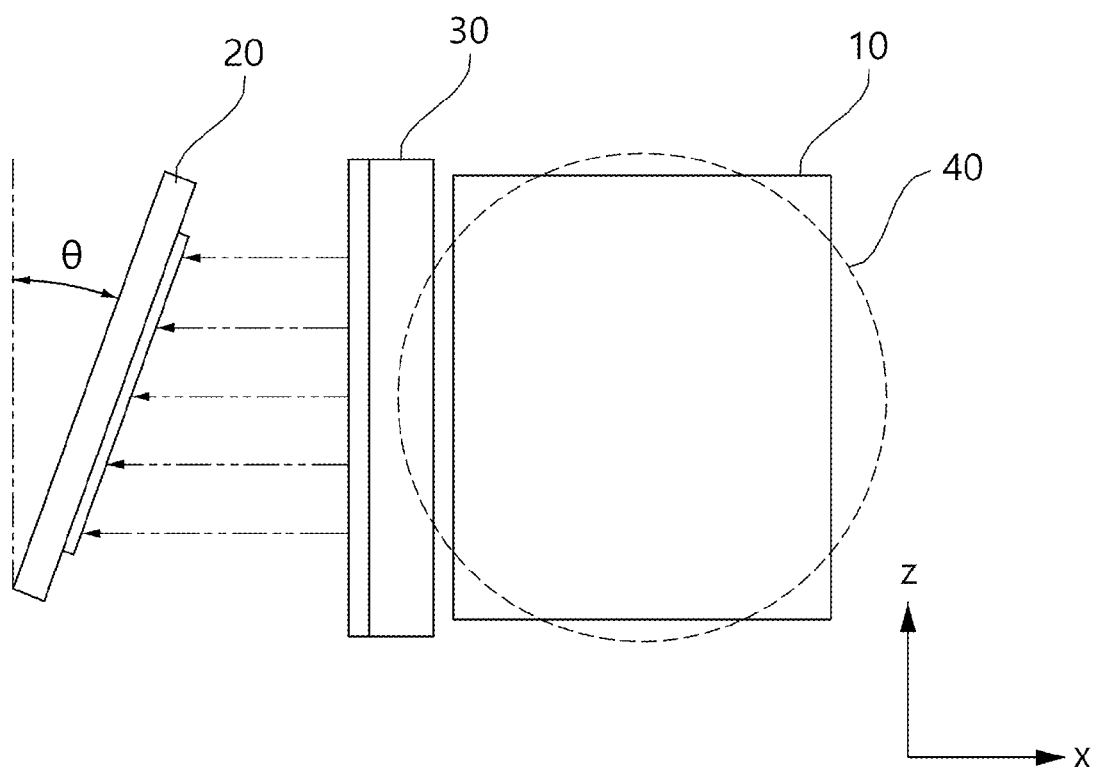
FIG. 2 is a projection view of the image acquisition device viewed from direction A of FIG. 1 according to an exemplary embodiment of the present invention.

FIG. 1 is a diagram illustrating an image acquisition device 100 according to an exemplary embodiment of the present invention and FIG. 2 is a projection view of the image acquisition device 100 viewed from direction A of FIG. 1 according to an exemplary embodiment of the present invention.

Referring to FIGS. 1 and 2, the image acquisition device 100 according to an exemplary embodiment of the present invention includes a first sensor 10, a second sensor 20, a reflector 30, a tube lens 40 disposed below the first sensor 10 and the reflector 30, and an object lens 50 disposed below the tube lens 40. The first sensor 10, the second sensor 20, the reflector 30, and the tube lens 40 may be disposed in a housing H (barrel) as illustrated in FIG. 1, but the present invention is no limited thereto, and only the first sensor 10, the second sensor 20, and the reflector 30 may also be disposed in the housing H.

As an example, the image acquisition device 100 may be an optical microscope, but is not limited thereto.

The first sensor 10 and the second sensor 20 as a kind of image sensor may be sensors which converts an optical signal into an electric signal to acquire image information. As an example, the first sensor 10 ad the second sensor 20 may adopt a time delay integration (TDI) sensor, a line scan sensor, or an area scan sensor according to the type of sample S to be photographed or a photographing region.

A size of the reflector 30 may also be adjusted according to the sizes or types of the first sensor 10 and the second sensor 20.

The reflector 30 may be a reflection mirror, but is not limited thereto, and may also be constituted by a beam splitter.

The tube lens 40 may mean a lens in which a magnification is set according to a focal distance of the object lens 50.

Beams incident in the first sensor 10 and the second sensors 20 may be beams emitted from an illumination unit (not illustrated) disposed below the sample S.

In the image acquisition device 100 according to an exemplary embodiment of the present invention, when the beams are emitted from the illumination unit, some (first beam) of the beams is incident in the sample S, the object lens 50, the tube lens 40, and the first sensor 10 in order, and as a result, a first image may be generated.

Alternatively, at least some (second beam) of the remaining beams among the beams is incident in the sample S, the object lens 50, the tube lens 40, the reflector 30, and the second sensor 20 in order, and as a result, a second image may be generated. As an example, the second beam may be all of the remaining beams other than the first beam among the beams emitted from the illumination unit or some of the remaining beams other than the first beam.

Although not illustrated, the sample S may be disposed on a slide unit (not illustrated), and a distance of the object lens 50 from the sample S or the slide unit may be adjusted according to a control signal of a separate driving control means (not illustrated).

The slide unit may move in a scan direction (X-axis direction) by driving of the separate driving control means (not illustrated), and as a result, the sample S disposed on the slide unit may move in the scan direction (X-axis direction) by driving the slide unit.

The first sensor 10 may generate the first image by collecting some (first beam) of the beams projected from the sample S, and may be disposed perpendicular to an optical axis (Y axis). For example, the first sensor 10 may be disposed perpendicular to the optical axis (Y axis) (disposed on a Z-X plane perpendicular to the optical axis) as illustrated in FIGS. 1 and 2. However, the first sensor 10 is not particularly disposed perpendicular to the optical axis (Y axis), and it is also possible that the first sensor 10 is disposed in a state of being tilted to the optical axis (Y axis) at a predetermined angle.

The first sensor 10 may be the image photographing sensor, and the beam (first beam) incident in the first sensor 10 may mean a beam required for generation of a photographing image.

The second sensor 20 may be disposed spaced apart from the first sensor 10, and may generate the second image for measuring the focus position by collecting at least some (second beam) of the remaining beams of the beams projected from the sample S.

The second sensor 20 may be the focus position determination sensor, and the beam incident in the second sensor 20 may mean a beam for measuring the focus position of the photographing image.

As an example, the second sensor 20 may be disposed to be tilted in a horizontal direction to an axis (Z axis) perpendicular to the optical axis (Y axis) at a predetermined angle θ to enhance a depth of focus of the second image as illustrated in FIG. 2. However, although not limited thereto, the second sensor 20 may also be disposed to be tilted in a perpendicular direction to the axis (Z axis) perpendicular to the optical axis (Y axis) at the predetermined angle θ.

An angle θ at which the second sensor 20 is tilted to the axis (Z axis) perpendicular to the optical axis (Y axis) may be set according to the depth of focus of the second image and a thickness of the sample S. When the depth of focus of the second image is low and the thickness of the sample S is large, the tilted angle θ becomes larger to increase a focus range of the second image acquired by the second sensor 20.

The reflector 30 may reflect at least some (second beam) of the remaining beams of the beams projected from the sample S to be incident in the second sensor 20. In this case, the second beam may be incident in the second sensor 20 in a the scan direction (X-axis direction) perpendicular to the optical axis (Y axis) as illustrated in FIGS. 1 and 2, but the present invention is not limited and it is also possible that the second beam is incident in the second sensor 20 in a direction not perpendicular to the optical axis (Y axis).

As an example, a length of the reflector 30 in the scan direction (X-axis direction) may be smaller than the length of the first sensor 10 in the scan direction (X-axis direction) as illustrated in FIGS. 1 and 2.

Preferably, the reflector 30 may be closer to the sample S (or the tube lens 40 and the object lens 50) than to the first sensor 10 when viewed in the optical axis direction (Y axis).

In this case, an optical path length until the first beam reaches the first sensor 10 may be equal or almost equal to an optical path length in which until the second beam reaches the second sensor 20.

Figure 3:
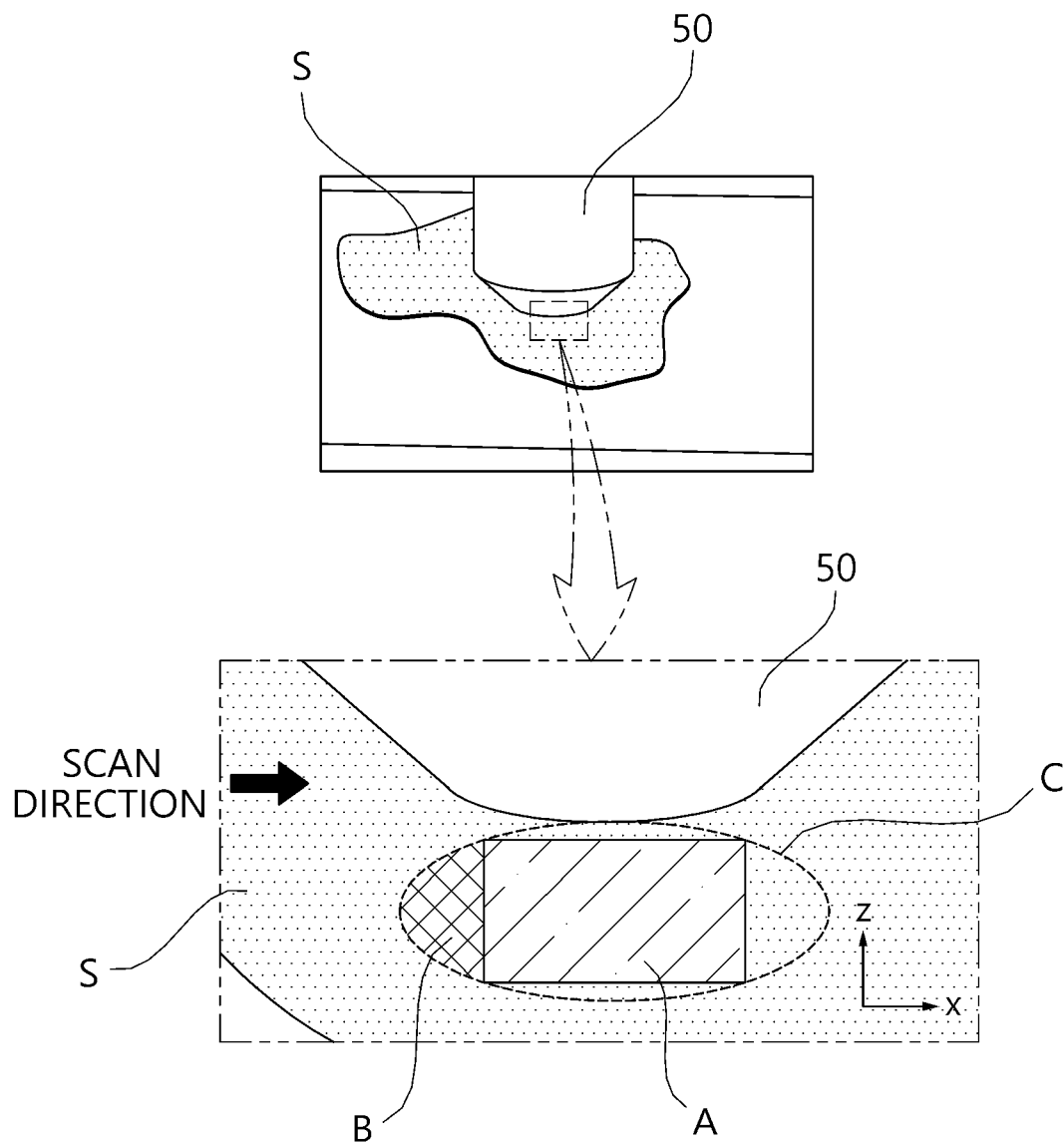
FIG. 3 is an enlarged diagram of a sample part in the image acquisition device according to an exemplary embodiment of the present invention.
Figure 4:
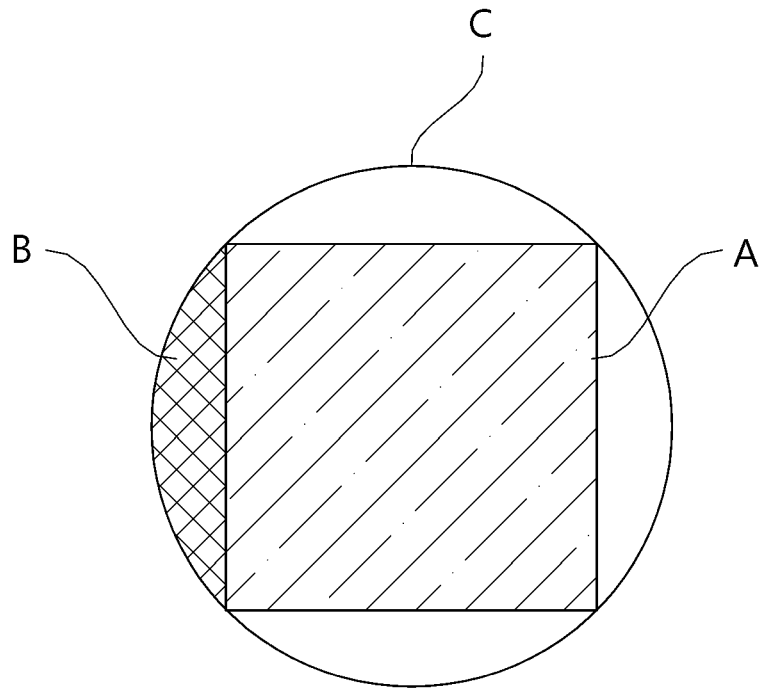
FIG. 4 is a diagram illustrating a state in which a region in an image circle is separated in the image acquisition device according to an exemplary embodiment of the present invention.

FIG. 3 is an enlarged diagram of a sample (S) part in the image acquisition device 100 according to an exemplary embodiment of the present invention and FIG. 4 is a diagram illustrating a state in which a region in an image circle is separated in the image acquisition device 100 according to an exemplary embodiment of the present invention. In this case, FIG. 3 illustrates a state of photographing the sample S through the object lens 50.

In FIGS. 3 and 4, an uppercase 'A' represents a region which becomes the first image and an uppercase 'B' represents a region which becomes the second image, and an uppercase 'C' represents an image circle.

When the first sensor 10 and the second sensor 20 are the area scan sensors, a region separation state in the image circle through the reflector 30 may be shown as illustrated in FIGS. 3 and 4.

In FIGS. 3 and 4, the image circle represents a cross section of an optical cone transmitted onto an image plane by a lens or a series of lenses, and may mean an image circle formed when light hits a perpendicular target such as a photographic film or a sensor of a digital camera. In the exemplary embodiment of the present invention, the image circle may be formed by the tube lens 40.

Referring to FIGS. 3 and 4, it can be seen that the region which become the first image generated by collecting some (first beam) of the beams projected from the sample S by the first sensor 10 in the image circle and the region which becomes the second image generated by collecting at least some (second beam) of the remaining beams of the beams projected from the sample S by the second sensor 20 are distinguished.

The first sensor 10 may be the image photographing sensor as described above, and the beam (first beam) incident in the first sensor 10 may represent a beam required for generation of the photographing image (first image). Further, the beam (second beam) incident in the second sensor 20 may mean a beam for measuring the focus position of the photographing image (first image).

More specifically, referring to FIGS. 3 and 4, it can be seen that the region which becomes the second image is generated at an outer portion of the region which becomes the first image in the image circle (for example, formed at a left side of the region which becomes the first image).

That is, in the present invention, since the region which becomes the second image may be generated in the outer region of the region which becomes the first image in the image circle, the second image may not influence the light amount of the first beam incident in the first sensor 10 in order to generate the first image.

In the image acquisition device 100 according to an exemplary embodiment of the present invention, since the region which becomes the image (second image) for measuring the focus position of the photographing image (first image) generated by the focus position determination sensor (second sensor 20) is generated in the outer region of the region which becomes the photographing image (first image) generated by the image photographing sensor (first sensor 10), the photographing image may be acquired while acquiring the accurate focus position without a decrease in light amount incident in the image photographing sensor (first sensor 10).

There is an advantage that an increase in photographing time generated by increasing the exposure time of the lens is not required in order to overcome the decrease in light amount transferred to the image photographing sensor (first sensor 10).

Figure 5:
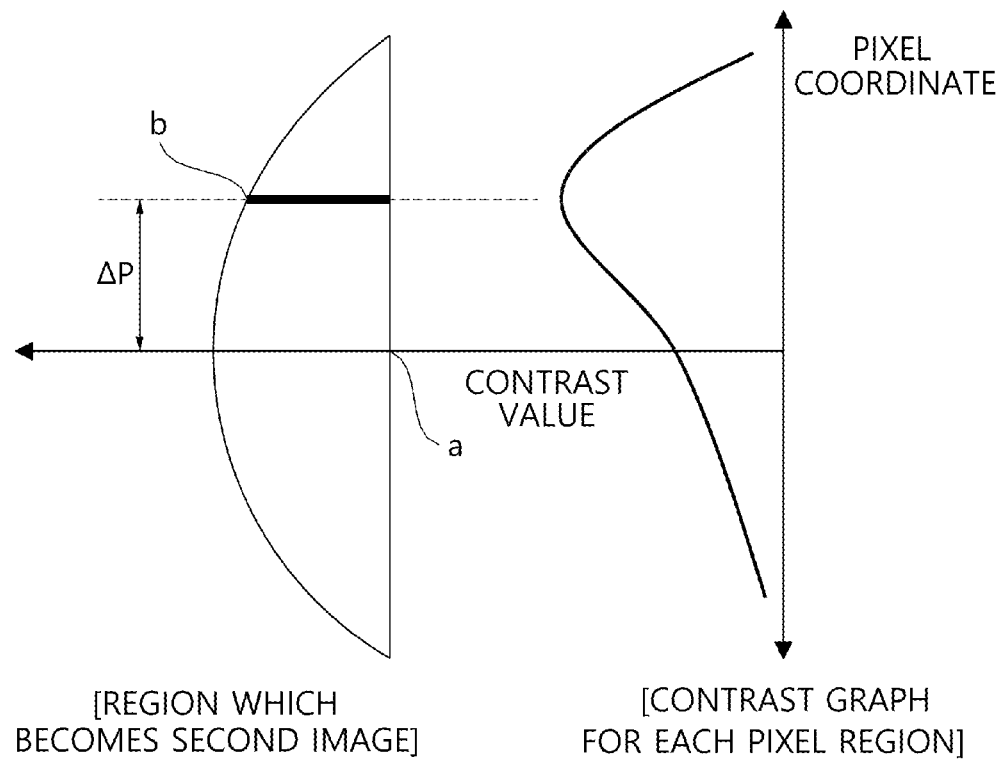
FIGS. 5 and 6 are diagrams illustrating that a defocus amount of a focus position determination sensor is detected in the image acquisition device according to an exemplary embodiment of the present invention.
Figure 6:
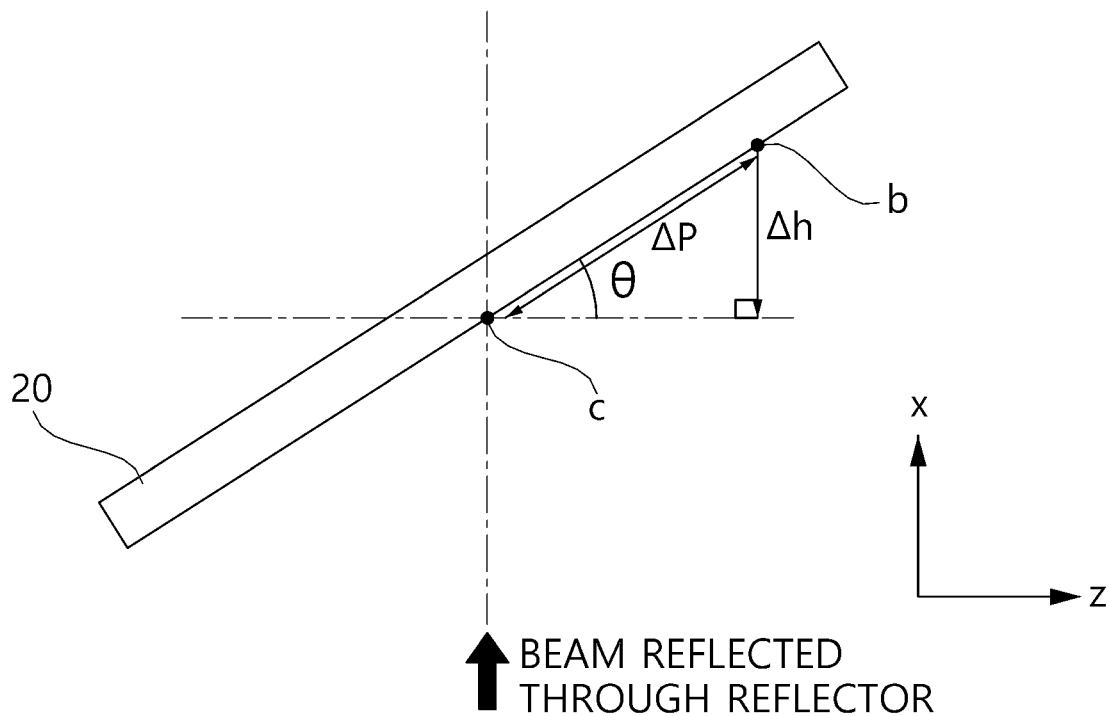

FIGS. 5 and 6 are diagrams illustrating that a defocus amount of a focus position determination sensor (second sensor 20) is detected in the image acquisition device 100 according to an exemplary embodiment of the present invention. In this case, in FIG. 5, detecting the defocus amount of the focus position determination sensor (second sensor 20) is described by using the region which becomes the second image and in FIG. 6, detecting the defocus amount of the focus position determination sensor (second sensor 20) is described by using the focus position determination sensor (second sensor 20).

Referring back to FIG. 1, the image acquisition device 100 according to an exemplary embodiment of the present invention further includes a defocus amount detection unit 60, a defocus correction value calculation unit 70, and a focus adjustment unit 80.

The defocus amount detection unit 60 may detect a degree ΔP of the focal distance which deviates from a normal focus by analyzing the second image acquired by the second sensor 20 as illustrated in FIGS. 5 and 6.

In FIG. 5, a may mean a center in the region which becomes the second image and b may mean a point where a contrast value of the region which becomes the second image is the highest.

In FIG. 6, b may mean the point where the contrast value of the region which becomes the second image is the highest similarly to b illustrated in FIG. 5, and c may mean the center of the second sensor (focus position determination sensor) 20.

As an example, the degree ΔP of the focal distance which deviates from the normal focus may mean a degree of a distance which deviates from the center of the second sensor 20.

The defocus amount detection unit 60 may be configured to calculate the degree ΔP of the focal distance which deviates from the normal focus by determining the highest contrast point (portions b in FIGS. 5 and 6) of the region which becomes the second image.

As illustrated in FIG. 6, the second sensor 20 may be disposed to be tilted to the axis (Z axis) perpendicular to the optical axis (Y axis) at the predetermined angle θ.

When the second image acquired by the second sensor 20 is accurately in focus, the contrast value of the region which becomes the second image should be the highest at the center c of the second sensor 20.

However, as illustrated in FIGS. 5 and 6, when the contrast value of the region which becomes the second image is the highest at point b separated from the center of the second sensor 20 by ΔP, Δh which is the defocus amount of the focus of the second sensor 20 may be defined as ΔP×sin θ.

Therefore, the defocus amount detection unit 60 may be configured to detect the defocus amount Δh of the second sensor 20 by determining the highest contrast point of the region which becomes the second image.

Specifically, the defocus amount detection unit 60 may analyze the second image, and detect the defocus amount Δh of the second sensor 20 by using the degree ΔP of the focal distance which deviates from the detected normal focus and the angle θ at which the second sensor 20 is tilted to the axis (Z axis) perpendicular to the optical axis (Y axis).

Next, the defocus correction value calculation unit 70 may calculate a defocus correction value ΔH according to the defocus amount Δh of the second sensor 20 detected by the defocus amount detection unit 60.

After the sample S is moved in the scan direction (X-axis direction) from a current sample (S) photographing position according to the defocus correction value ΔH calculated by the defocus correction value calculation unit 70 as such, the focus position at a next photographing position may be accurately determined.

In this case, the defocus correction value ΔH may mean a focus adjustment amount of the object lens 50 at the next photographing position according to the defocus amount Δh detected at the current sample (S) photographing position.

Meanwhile, a depth of field of the object lens 50 may have a large difference from a depth of focus of the camera, and in general, the depth of field of the object lens may be short and the depth of focus of the camera may be long.

As an example, when the depth of field of the object lens 50 is 0.1 mm and the depth of focus of the second sensor 20 is 1 mm, an effect such as adjusting the focus of the object lens 50 by 0.1 mm may be shown only by adjusting the focus of the second sensor 20 by 1 mm.

Therefore, the second image acquired by the second sensor 20 may not be accurately in focus even by adjusting the focus of the object lens 50 by the detected defocus amount Δh.

In order to solve such a problem, when the defocus correction value calculation unit 70 of the present invention calculates the defocus correction value ΔH, the depth of focus, F of the second sensor (focus position determination sensor) 20 and the depth of field, f of the object lens 50 may be additionally considered in addition to the defocus amount Δh.

The defocus correction value ΔH may be calculated by the defocus correction value calculation unit 70 as in Equation 1 below.

$$\Delta H = (\Delta P \times \sin\theta) \times \frac{f}{F} \qquad \text{[Equation 1]}$$

Equation 1 above may mean a value acquired by multiplying the defocus amount Δh by a ratio of the depth of field, f of the object lens 50 and the depth of focus, F of the second sensor (focus position determination sensor) 20.

When the focus of the second sensor 20 is adjusted by adjusting the focus of the tube lens 40 other than the object lens 50, the depth of focus, F of the second sensor (focus position determination sensor) 20 and a depth of focus, f' of the tube lens 40 may be additionally considered in addition to the defocus amount Δh at the time of calculating a defocus correction value ΔH'.

In this case, the defocus correction value ΔH' may mean a focus adjustment amount of a tube lens 40' at the next photographing position according to the defocus amount Δh detected at the current sample (S) photographing position.

The defocus correction value ΔH' may be calculated by the defocus correction value calculation unit 70 as in Equation 2 below.

$$\Delta H' = (\Delta P \times \sin\theta) \times \frac{f'}{F} \qquad \text{[Equation 2]}$$

Equation 2 above may mean a value acquired by multiplying the defocus amount Δh by a ratio of the depth of focus, f' of the tube lens 40 and the depth of focus, F of the second sensor (focus position determination sensor) 20.

The focus adjustment unit 80 may adjust the focus of the tube lens 40 or the object lens 50 according to the defocus correction values ΔH and ΔH' calculated by the defocus correction value calculation unit 70. As an example, the focus adjustment unit 80 may also be disposed between the tube lens 40 and the object lens 50, and also configured by a motor, but is not limited thereto.

According to the image acquisition device 100 of the present invention, since a sample can be photographed at a high speed without a decrease in light amount incident in an image photographing sensor and accurate focus position at a next photographing position can be acquired, the image acquisition device 100 can acquire an automatic focus position and a photographing time can be reduced.

Figure 7:
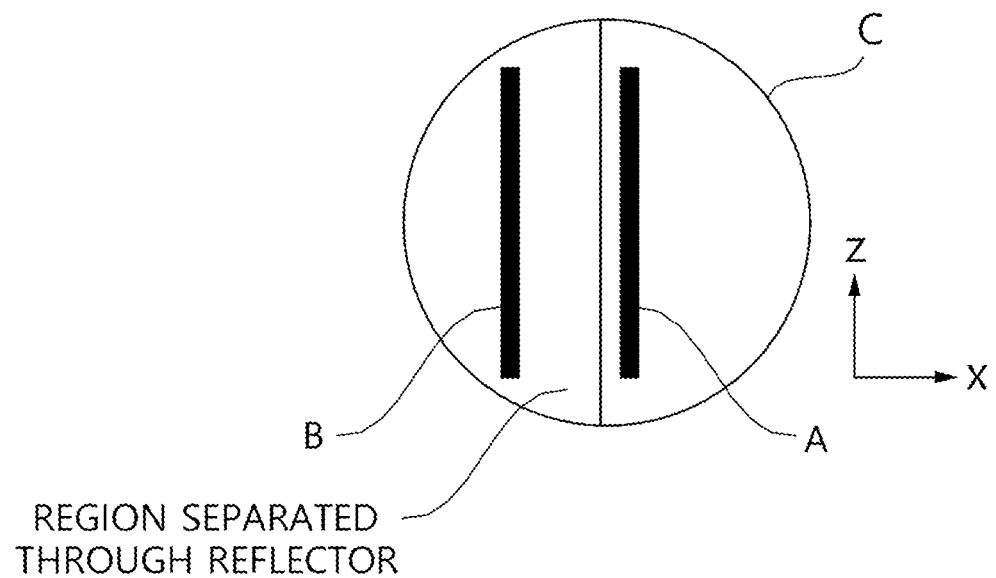
FIG. 7 is a diagram illustrating a state in which the region in the image circle is separated depending on types of first sensor, second sensor, and reflector provided in the image acquisition device according to an exemplary embodiment of the present invention.
Figure 7:
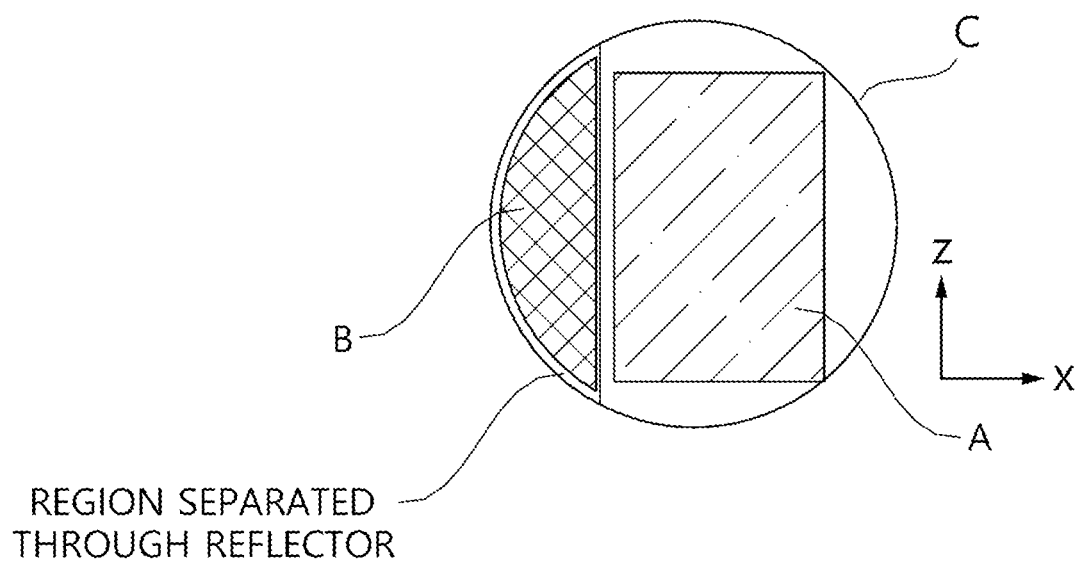

FIG. 7 is a diagram illustrating a state in which the region in the image circle is separated depending on types of first sensor 10, second sensor 20, and reflector 30 provided in the image acquisition device 100 according to an exemplary embodiment of the present invention. Specifically, in FIG. 7, (a) of FIG. 7 illustrates a case where the first sensor 10 and the second sensor 20 are the TDI sensor or the line scan sensor, and (b) of FIG. 7 illustrates a case where the first sensor 10 and the second sensor 20 are the area scan sensor.

Similarly in FIGS. 3 and 4, in FIG. 7, the uppercase 'A' represents the region which becomes the first image and the uppercase 'B' represents the region which becomes the second image, and the uppercase 'C' represents the image circle.

As described above, the size of the reflector 30 may also be adjusted according to the sizes or types of the first sensor 10 and the second sensor 20.

When the first sensor 10 and the second sensor 20 are the TDI sensor or the line scan sensor as illustrated in (a) of FIG. 7, the sizes of the region which becomes the first image and the region which becomes the second image which are image-formed may be smaller than those when the first sensor 10 and the second sensor 20 are the area scan sensor as illustrated in (b) of FIG. 7.

Accordingly, when the first sensor 10 and the second sensor 20 are configured by the TDI sensor or the line scan sensor as illustrated in (a) of FIG. 7, the sizes of the region which becomes the first image and the region which becomes the second image are generated to be small, so the size of the reflector 30 may be formed to be larger than that illustrated in (b) of FIG. 7.

As an example, in the case of (a) of FIG. 7, the length of the reflector 30 in the scan direction (X-axis direction) may also be formed to be approximately 50% of the length of the first sensor 10 in the scan direction (X-axis direction) unlike the case illustrated in FIGS. 1 and 2.

As a result, when the first sensor 10 and the second sensor 20 are configured by the TDI sensor or the line scan sensor as illustrated in (a) of FIG. 7, a region occupied by the first sensor 10 in the image circle is smaller than that when the first sensor 10 and the second sensor 20 are the area scan sensor, and as a result, a region at which the region which becomes the second image for determining the focus position in the image circle may be made to be larger than the case illustrated in (b) of FIG. 7.

Meanwhile, when the first sensor 10 and the second sensor 20 are configured by the area scan sensor as illustrated in (b) of FIG. 7, the second image may also be generated like the region which becomes the second image in (a) of FIG. 7.

In the image acquisition device 100 according to an exemplary embodiment of the present invention, the first sensor 10 may be configured by the TDI sensor or the line scan sensor and the second sensor 20 may be configured by the area scan sensor, or the first sensor 10 may be configured by the area scan sensor and the second sensor 20 may be configured by the TDI sensor or the line scan sensor.

Figure 8:
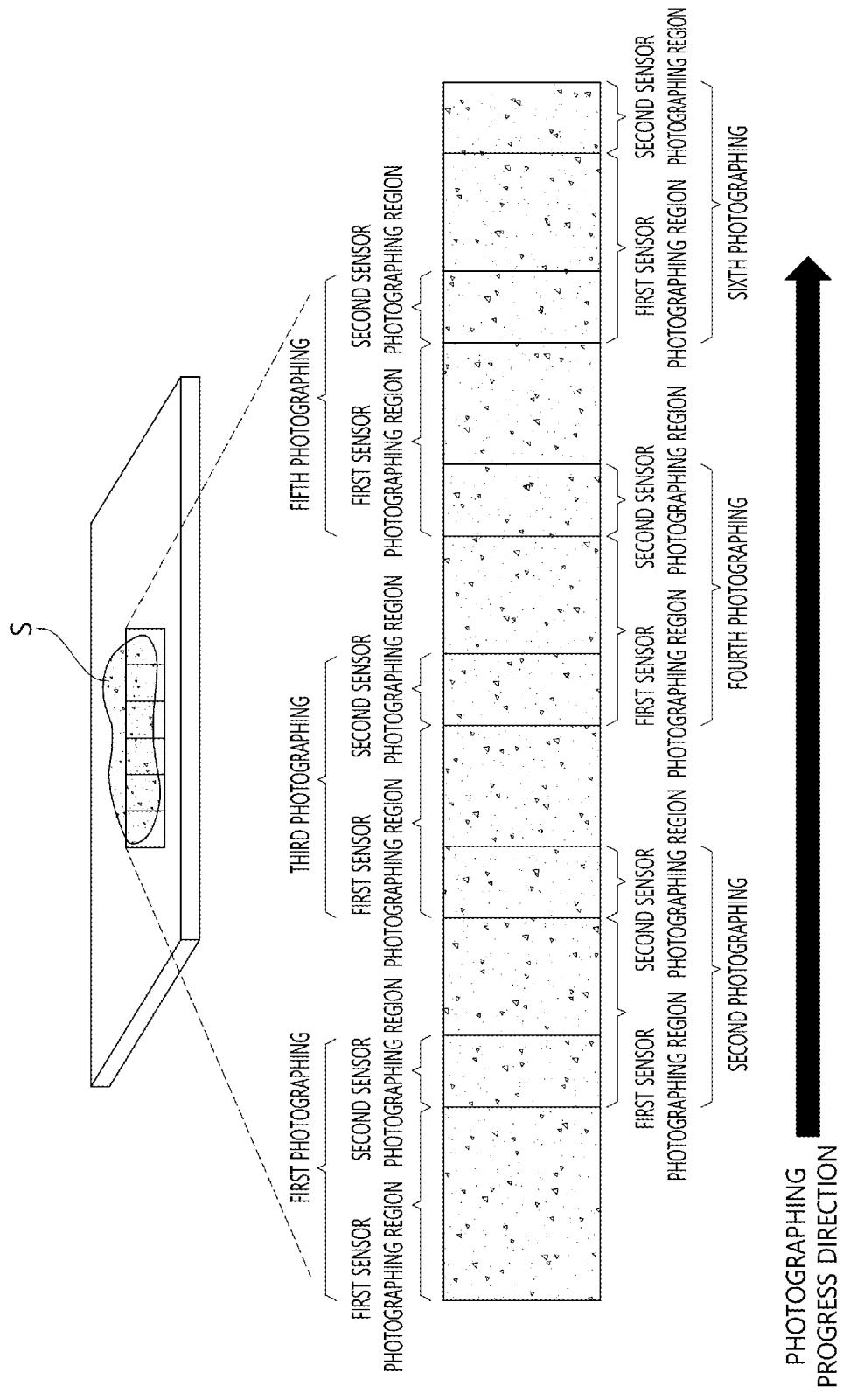
FIG. 8 is a diagram schematically illustrating a method for adjusting a focus position of an image acquisition device according to an exemplary embodiment of the present invention.
Figure 9:
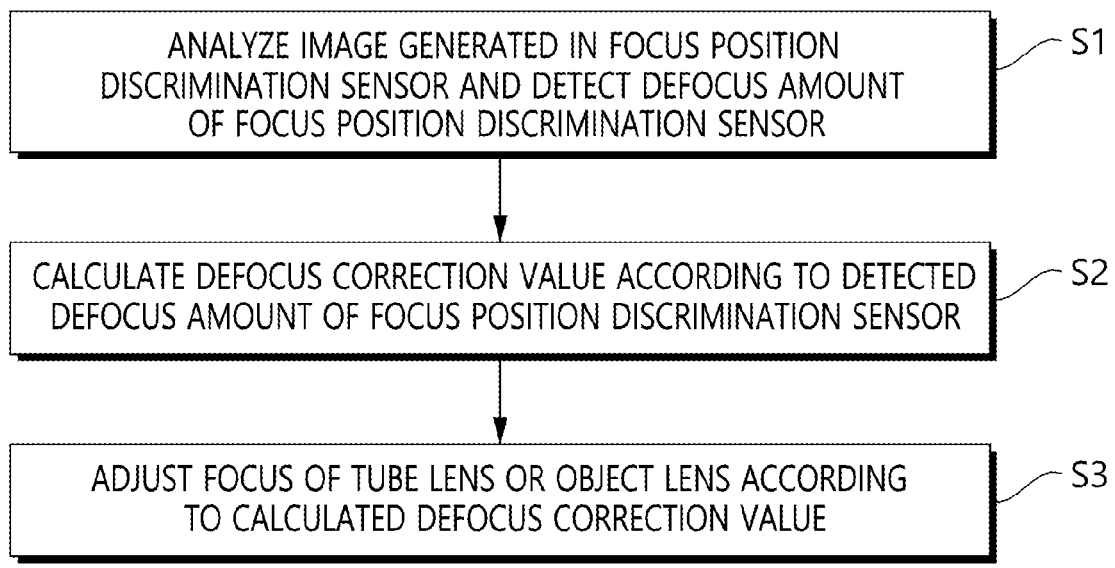
FIG. 9 is a flowchart illustrating a method for adjusting a focus position of an image acquisition device according to an exemplary embodiment of the present invention.

FIG. 8 is a diagram schematically illustrating a method for adjusting a focus position of an image acquisition device 100 according to an exemplary embodiment of the present invention and FIG. 9 is a flowchart illustrating a method for adjusting a focus position of an image acquisition device 100 according to an exemplary embodiment of the present invention.

Referring to FIG. 8, when first photographing and second photographing for the sample S are performed by using the image acquisition device 100, the region which becomes the second image by the focus position determination sensor (second sensor 20) in a first photographing region and the region which becomes the first image by the image photographing sensor (first sensor 10) in a second photographing region may be partially overlapped.

Accordingly, when the first photographing and the second photographing for the sample S are performed while moving the sample S in the scan direction (X-axis direction) by using the image acquisition device 100 according to an exemplary embodiment of the present invention, a next photographing position for the sample S may be designated so that a region which becomes the second image at the current photographing position for the sample S is overlapped with the region which becomes the first image at the next photographing position. As an example, driving control of the slide unit in which the sample S is disposed may be achieved by the separate driving control means (not illustrated), and designation of the next photographing position for the sample S may be achieved by an input of a user through a user interface (not illustrated) or by a separate automation system.

Referring to FIGS. 8 and 9, a method for adjusting a focus position of the image acquisition device 100 according to an exemplary embodiment of the present invention will be described below.

First, the image (second image) generated in the focus position determination sensor (second sensor 20) is analyzed to detect the defocus amount $\Delta h$ of the focus position determination sensor upon photographing the sample S at the current photographing position (e.g., first photographing position) using the image acquisition device 100 (step S1). In this case, step S1 above may be performed by the defocus amount detection unit 60, and the defocus amount detection unit 60 may detect the defocus amount $\Delta h$ of the focus position determination sensor by determining the highest contrast point of the region which becomes the image (second image) generated in the focus position determination sensor.

Next, the defocus correction values $\Delta H$ and $\Delta H'$ are calculated according to the detected defocus amount $\Delta h$ of the focus position determination sensor (step S2). In this case, step S2 above may be performed by the defocus correction value calculation unit 70.

Next, the focus of the tube lens 40 or the object lens 50 is adjusted according to the calculated defocus correction values $\Delta H$ and $\Delta H'$ (step S3). In this case, step S3 above may be performed by the focus adjustment unit 80, and the focus adjustment unit 80 may adjust the focus of the tube lens 40 or the object lens 50 according to the defocus correction values $\Delta H$ and $\Delta H'$ calculated before the sample S reaches the second photographing position by the image acquisition device 100.

Thereafter, the focus of the first sensor 10 at the next photographing position (e.g., second photographing position) for the sample S may be adjusted according to the focus position measured by the second sensor 20, and as a result, the photographing image (first image) may be acquired, in which the focus at the next photographing position for the sample S is accurately adjusted.

As an example, the focus adjustment of the first sensor 10 may be achieved by an auto focus (AF) adjustment scheme of automatically adjusting the focus for the sample S according to the focus position measured by the second sensor 20, but is not limited thereto.

Meanwhile, in the exemplary embodiment of the present invention, similarly when the first photographing and the second photographing are performed, the region which becomes the second image by the focus position determination sensor (second sensor 20) in the second photographing region and the region which becomes the first image by the image photographing sensor (first sensor 10) in a third photographing region may be partially overlapped when the second photographing and third photographing for the sample S are performed by using the image acquisition device 100 as illustrated in FIG. 8.

Even when the second photographing and the third photographing for the sample S are performed by using the image acquisition device 100, the focus position determination in steps S1 to S3 described above may be performed, and the focus of the first sensor 10 at a next photographing position (e.g. third photographing position) for the sample S may be adjusted according to the focus position measured by the second sensor 20, and as a result, the photographing image (first image) may be acquired in which the focus is accurately adjusted at the next photographing position for the sample S.

Even when fourth photographing, fifth photographing, sixth photographing for the sample S, and photographing of the number of times exceeding the sixth photographing are performed by using the image acquisition device 100, the focus position adjusting method in steps S1 to S3 described above may be performed by the same scheme, and the focus of the first sensor 10 at a next photographing position (e.g. a fourth photographing position, a fifth photographing position, a sixth photographing position, etc.) for the sample S may be adjusted according to the focus position measured by the second sensor 20, and as a result, the photographing image (first image) may be acquired in which the focus is accurately adjusted at the next photographing position for the sample S.

Figure 10:
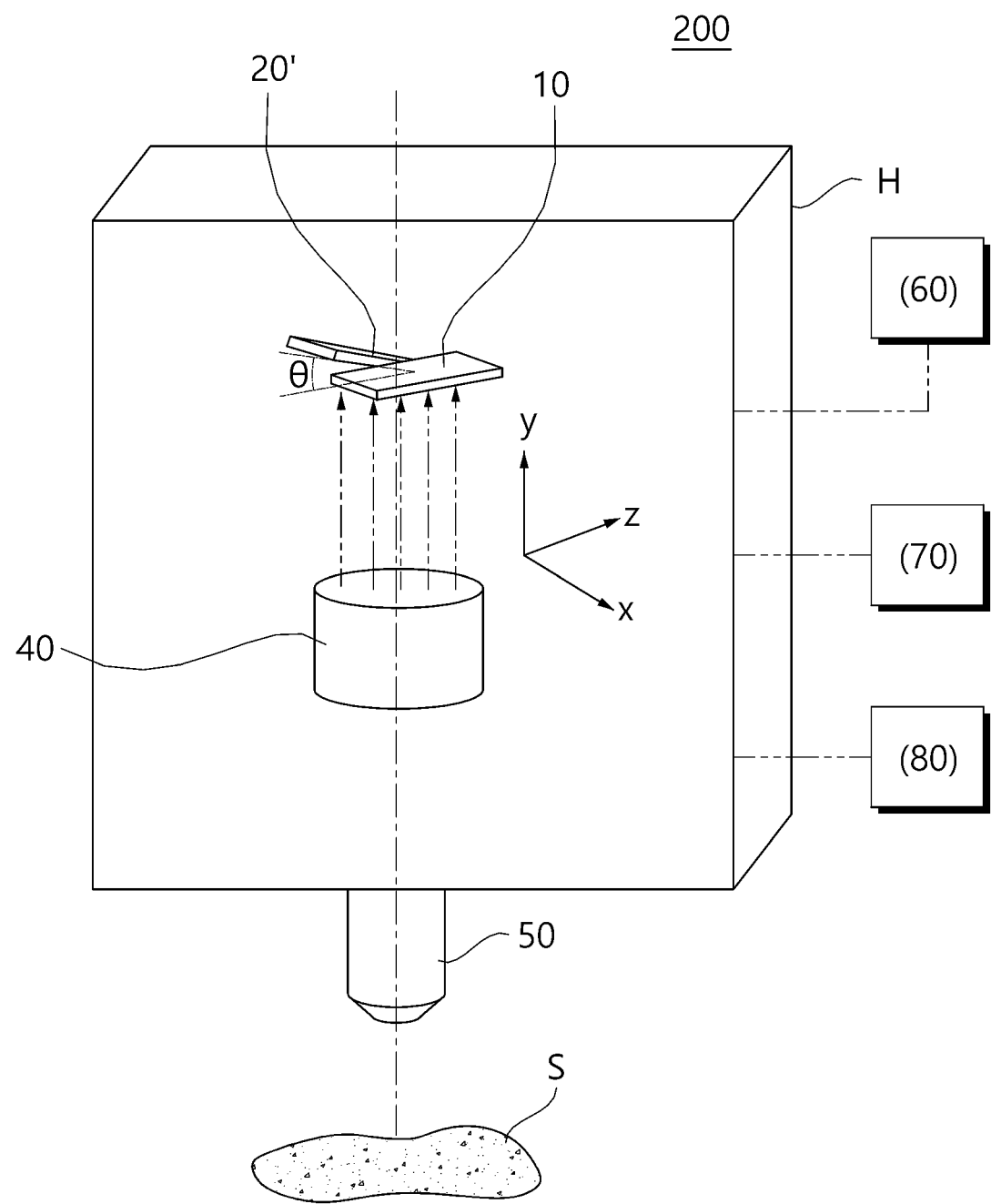
FIG. 10 is a diagram illustrating an image acquisition device according to a second exemplary embodiment of the present invention.

FIG. 10 is a diagram illustrating an image acquisition device 200 according to a second exemplary embodiment of the present invention.

Referring to FIG. 10, in the case of the image acquisition device 200 according to the second exemplary embodiment of the present invention, there is no significant structural difference from the image acquisition device 100 according to the first exemplary embodiment except the reflector 30 is not provided unlike the image acquisition device 100 according to the first exemplary embodiment and a second sensor 20' is disposed adjacent to the first sensor 10. Therefore, the same component as the image acquisition device 100 according to the first exemplary embodiment is represented by using the same reference numeral, and a duplicated description will be omitted.

Referring to FIG. 10, the second sensor 20' provided in the image acquisition device 200 according to the second exemplary embodiment may be disposed adjacent to the first sensor 10. In this case, the beam may be incident in the first sensor 10 and the second sensor 20' through the optical axis (Y axis) as illustrated in FIG. 10.

The first sensor 10 collects some of the beams projected from the sample S to generate the first image, and the second sensor 20' collects at least some of the remaining beams of the beams projected from the sample S to generate the second image for measuring the focus position.

In this case, similarly to the image acquisition device 100 according to the first exemplary embodiment, the first sensor 10 of the image acquisition device 200 according to the second exemplary embodiment may also be disposed perpendicular to the optical axis (Y axis) (disposed on the Z-X plane perpendicular to the optical axis) as illustrated in FIG. 10. However, the first sensor 10 is not particularly disposed perpendicular to the optical axis (Y axis), and it is also possible that the first sensor 10 is disposed in a state of being tilted to the optical axis (Y axis) at a predetermined angle.

As an example, the length of the second sensor 20' of the image acquisition device 200 according to the second exemplary embodiment in the scan direction (X-axis direction) may be smaller than the length of the first sensor 10 in the scan direction (X-axis direction).

In the image acquisition device 200 according to the second exemplary embodiment, the tube lens 40 may be disposed below the first sensor 10 and the second sensor 20', and the object lens 50 may be disposed below the tube lens 40.

Similarly to the image acquisition device 100 according to the first exemplary embodiment, the second sensor 20' of the image acquisition device 200 according to the second exemplary embodiment may also be disposed to be tilted in the perpendicular direction to the axis (Z axis) which is perpendicular to the optical axis (Y axis) at the predetermined angle θ.

The second sensor 20' may be located on the same line (e.g., disposed on the same X-Z plane) in the horizontal direction to the first sensor 10 when viewed from the direction of the optical axis (Y axis).

In this case, the optical path length until the first beam reaches the first sensor 10 may be equal or almost equal to an optical path length until the second beam reaches the second sensor 20'.

Even in the image acquisition device 200' according to the second exemplary embodiment of the present invention, since the region which becomes the image (second image) for measuring the focus position of the photographing image (first image) generated by the focus position determination sensor (second sensor 20') is generated in the outer region of the region which becomes the photographing image (first image) generated by the image photographing sensor (first sensor 10), the photographing image may be acquired while acquiring the accurate focus position without a decrease in light amount incident in the image photographing sensor (first sensor 10).

There is an advantage that an increase in photographing time generated by increasing the exposure time of the lens is not required in order to overcome the decrease in light amount transferred to the image photographing sensor (first sensor 10).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An image acquisition device comprising:
   a first sensor collecting some of beams projected from a sample to generate a first image;
   a second sensor collecting at least some of remaining beams of the beams projected from the sample to generate a second image for measuring a focus position;
   a tube lens on which the some of the beams projected from the sample are incident; and
   an object lens disposed below the tube lens,
   wherein the tube lens is disposed below the first sensor and the second sensor,
   wherein a focus of the first sensor is adjusted by the focus position measured by using the second sensor,
   wherein an optical path length until the some of the beams projected from the sample reach the first sensor is equal to an optical path length until the at least some of the remaining beams of the beams projected from the sample reach the second sensor, and
   wherein the second sensor is disposed adjacent to the first sensor, and
   the second sensor is located on a same line as the first sensor in a horizontal direction when viewed in a direction of an optical axis.

2. The image acquisition device of claim 1, wherein the first sensor is disposed perpendicular to the optical axis.

3. The image acquisition device of claim 1, wherein the second sensor is disposed to be tilted relative to an axis perpendicular to the optical axis at a predetermined angle.

4. The image acquisition device of claim 1, further comprising:
   circuitry configured to function as
      a defocus amount detection unit analyzing the second image and detecting a defocus amount of the second sensor;
      a defocus correction value calculation unit calculating a defocus correction value according to the detected defocus amount of the second sensor; and
      a focus adjustment unit adjusting a focus of the tube lens or the object lens according to the calculated defocus correction value.

5. The image acquisition device of claim 4, wherein the defocus amount detection unit is configured to detect the defocus amount of the second sensor by determining a highest contrast point of a region which becomes the second image.

6. The image acquisition device of claim 4, wherein in an image circle formed by the tube lens, a region which becomes the second image is generated in an outer region of a region which becomes the first image.

7. The image acquisition device of claim 1, wherein the first sensor and the second sensor are any one of a time delay integration (TDI) sensor, a line scan sensor, or an area scan sensor.

8. The image acquisition device of claim 1, further comprising:
   a reflector reflecting the at least some of the remaining beams of the some of the beams projected from the sample to be incident on the second sensor,
   wherein the second sensor is disposed spaced apart from the first sensor.

9. The image acquisition device of claim 8, wherein the reflector is closer to the sample than to the first sensor when viewed in the direction of the optical axis.

10. The image acquisition device of claim 8, wherein a length of the reflector in a scan direction is smaller than a length of the first sensor in the scan direction.

11. The image acquisition device of claim 8,
    wherein the tube lens is disposed below the first sensor and the reflector.

12. The image acquisition device of claim 1, wherein a length of the second sensor in a scan direction is smaller than a length of the first sensor in the scan direction.

13. A method for adjusting a focus position of in the image acquisition device of claim 1, wherein the first sensor is an image photographing sensor and the second sensor is a focus position determination sensor, the method comprising:
    analyzing an image generated in the focus position determination sensor and detecting a defocus amount of the focus position determination sensor;
    calculating a defocus correction value according to the detected defocus amount of the focus position determination sensor; and
    adjusting a focus of the tube lens or the object lens according to the calculated defocus correction value.

14. The method of claim 13, wherein in the detecting of the defocus amount, a highest contrast point of a region which becomes the image generated in the focus position determination sensor is determined to detect the defocus amount of the focus position determination sensor.

15. The method of claim 13, wherein a photographing region of the focus position determination sensor is different from a photographing region of the image photographing sensor.

16. The method of claim 15, wherein a next photographing region of the image photographing sensor includes the photographing region of the focus position determination sensor.

* * * * *